United States Patent
Moilanen et al.

(10) Patent No.: US 6,302,462 B2
(45) Date of Patent: Oct. 16, 2001

(54) JAW TIPS AND JAW TIP ASSEMBLIES FOR PARTS GRIPPERS

(75) Inventors: Steven M. Moilanen; Kenneth Steele, both of Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 09/765,010

(22) Filed: Jan. 18, 2001

Related U.S. Application Data (62) Division of application No. 09/345,031, filed on Jun. 30, 1999.
(60) Provisional application No. 60/091,232, filed on Jun. 30, 1998.

(51) Int. Cl.$^7$ .................................................. B25J 15/04
(52) U.S. Cl. .............................. 294/88; 294/116; 294/902
(58) Field of Search ...................................... 294/1.1, 86.4, 294/82.18, 82.32, 88, 106, 115–119.1, 902; 269/257–259, 261, 262, 268–271, 279–284; 901/36–39

(56) References Cited

U.S. PATENT DOCUMENTS

| | | |
|---|---|---|
| 3,400,836 * | 9/1968 | Bende ............................. 294/902 X |
| 3,866,966 | 2/1975 | Skinner, II . |
| 4,106,646 | 8/1978 | Weisgerber . |
| 4,209,280 | 6/1980 | Bittner . |
| 4,305,692 | 12/1981 | Brauer . |
| 4,448,405 * | 5/1984 | Cipolla ............................. 294/88 X |
| 4,484,775 | 11/1984 | Norkus . |
| 4,600,357 | 7/1986 | Coules . |
| 4,605,354 | 8/1986 | Daly . |
| 4,626,014 | 12/1986 | Vredenbregt et al. . |
| 4,627,779 | 12/1986 | Cucchi et al. . |
| 4,647,097 * | 3/1987 | Lessway ............................. 294/902 X |
| 4,717,189 * | 1/1988 | Gabriel ............................. 294/82.32 |
| 4,730,861 | 3/1988 | Spencer . |
| 4,969,638 * | 11/1990 | Yang ............................. 269/258 X |
| 4,980,626 | 12/1990 | Hess et al. . |
| 5,004,284 | 4/1991 | Boaz . |
| 5,062,673 | 11/1991 | Mimura . |
| 5,078,440 | 1/1992 | Taniguchi . |
| 5,090,757 | 2/1992 | Huber et al. . |
| 5,108,140 | 4/1992 | Bartholet . |
| 5,131,705 | 7/1992 | Glück et al. . |
| 5,172,950 | 12/1992 | Benecke . |
| 5,172,951 | 12/1992 | Jacobsen et al. . |
| 5,178,431 | 1/1993 | Voellmer . |
| 5,188,579 | 2/1993 | Rüschle et al. . |
| 5,222,778 | 6/1993 | Moench . |
| 5,253,911 | 10/1993 | Egan et al. . |
| 5,253,912 | 10/1993 | Andorlini et al. . |
| 5,280,981 | 1/1994 | Schulz . |
| 5,328,222 | 7/1994 | Sartorio et al. . |
| 5,328,224 | 7/1994 | Jacobsen et al. . |
| 5,335,955 | 8/1994 | Pekka et al. . |
| 5,364,146 | 11/1994 | Brandorff et al. . |
| 5,397,159 | 3/1995 | Sartorio et al. . |
| 5,417,464 | 5/1995 | Seaberg et al. . |
| 5,516,173 | 5/1996 | Sawdon . |
| 5,570,920 | 11/1996 | Crisman et al. . |
| 5,647,625 | 7/1997 | Sawdon . |
| 5,762,390 | 6/1998 | Gosselin et al. . |
| 5,853,211 * | 12/1998 | Sawdon et al. .................... 294/88 X |

* cited by examiner

*Primary Examiner*—Johnny D. Cherry
(74) *Attorney, Agent, or Firm*—Barnes & Thornburg (57) ABSTRACT

A set of angled gripper jaw tips. Each jaw tip has a gripping surface that is complimentarily angled to the other jaw tip. The gripping surfaces become substantially coplanar when closed together.

13 Claims, 8 Drawing Sheets

JAW TIPS AND JAW TIP ASSEMBLIES FOR PARTS GRIPPERS

RELATED APPLICATION

This application is based upon U.S. Provisional Application Serial No. 60/091,232, filed Jun. 30, 1998, and is a divisional of U.S. Utility patent application Ser. No. 09/345,031, filed Jun. 30, 1999, the complete disclosures of which are hereby expressly incorporated by reference.

TECHNICAL FIELD

The present disclosure relates to fluid pressure actuated grippers of the type employed in automated workpiece handling devices which clampingly grip and transfer a workpiece from one station to another. More particularly, the present disclosure relates to jaw tip designs and jaws tip assemblies for fluid pressure actuated grippers.

BACKGROUND AND SUMMARY

Fluid pressure actuated grippers are widely employed and typically take the form of a pneumatic or hydraulic differential motor whose cylinder is fixedly mounted to a transfer device. At the forward or rod end of the cylinder housing, a gripper jaw mounting structure is fixedly mounted on the cylinder to pivotally support a pair of opposed gripper jaws which are coupled to the piston rod of the motor by a linkage so arranged that upon movement of the piston in one direction the jaws are pivoted to an open position and upon movement of the piston in the opposite direction the jaws are driven to a closed workpiece gripping position.

In typical operation, the gripper jaws will be closed upon a workpiece near the edge of the workpiece and the gripper will be advanced to position the gripped workpiece in operative relationship with a work station. The gripper will then be opened to release the workpiece and the transfer device will retract the gripper from the work station while the work operation is performed. At the conclusion of the work operation, the gripper will then advance back into the work station and the jaws will again close upon the workpiece and carry it away from the work station. Opening and closing the gripper jaws thus takes place when the gripper is in its closest proximity to tooling at the work station.

There are basically two types of linkage arrangements used in fluid pressure actuated grippers to connect the gripper jaws to the piston rods and effect movement of the gripper jaws. These are pivotable link arrangements and pivotal cam arrangements. An example of a pivotal link arrangement can be found in U.S. Pat. No. 5,152,568 to Blatt which discloses pivotal links 36 and 40 that cooperate with gripper jaws 12A and 12B as shown in FIG. 3.

U.S. Pat. No. 4,518,187 to Blatt, et al. discloses apivotal cam arrangement in which jaw plates 45 and 47 are pivoted by the cooperation of cam slots 61 provided in the jaw plates and a pivot pin 37 (and rollers 39) attached to the piston rod.

Fluid pressure actuated grippers are generally designed for use with particular workpieces to be transferred and with specific work stations. For example, some workpieces and/or work stations may require wider or narrower gripper jaws, different types of gripper jaws, gripper jaws that open at different angles, different clearance requirements, etc.

The present disclosure is directed to gripper jaw tips and jaw tip assemblies for fluid pressure actuated grippers which allow for the gripping, sensing and transferring of a variety of workpieces.

According to other features, characteristics, embodiments and alternatives of the present disclosure which will become apparent as the description thereof proceeds below, the present disclosure provides a set of opposable gripper jaw tips which includes:

a first jaw tip having a base and a spherical concave gripping surface; and a second jaw tip having a base and a spherical convex gripping surface, the spherical concave gripping surface of the second jaw tip being complimentarily shaped with the spherical concave gripping surface of the first jaw tip.

The present disclosure also provides a set of opposable angled gripper jaw tips which includes:

a first jaw tip having a base, a central axis, and a gripping surface which is non-perpendicular to the central axis; and a second jaw tip having a base, a central axis, and a gripping surface which is non-perpendicular to the central axis, the gripping surfaces of the first and second jaw tip being complimentarily angled so that they become substantially coplanar when closed together.

The present disclosure further provides a parts gripper sensor mounting assembly which includes:

a gripper jaw tip having a gripping surface, a side and a sensor bracket alignment structure; and a sensor mounting bracket which includes a sensor mounting structure, and an alignment structure which cooperates with the sensor bracket alignment structure so as to align the sensor mounting structure with the gripping surface of the jaw tip.

The present disclosure further provides a parts gripper sensor mounting assembly which includes:

a gripper jaw tip having a gripping surface, a structure for mounting the gripper jaw tip to a gripper jaw member, and a recessed portion in the gripping surface for receiving a sensor element therein.

The present disclosure still further provides a gripper tip extender which includes:

a base configured to be coupled to a gripper jaw tip seat; and at least one arm member which extends outward from the base, each of said at least one arm member including a plurality of gripper tip receiving openings.

The present disclosure still further provides a padded gripper tip which includes:

a base; and a pad coupled to the base, the pad including a gripping surface with a plurality of surface channels which are arranged in a pattern for directing fluids away from the gripping surface.

BRIEF DESCRIPTION OF DRAWINGS

The present disclosure will be described hereafter with reference to the attached drawings which are given as non-limiting examples only, in which:

FIG. 12b is an end view of the padded gripper tip of FIG. 12a.

FIG. 12c is a side view of the padded gripper tip of FIG. 12a.

FIG. 13a is a cross-sectional side view of another padded gripper tip having fluid expelling channels.

FIG. 13b is an end view of the padded gripper tip of FIG. 13a.

FIG. 13c is a side view of the padded gripper tip of FIG. 13a.

DETAILED DESCRIPTION OF THE DRAWINGS

The present disclosure is directed to jaw tips and jaw tip assemblies for fluid pressure actuated grippers which allow for the gripping, sensing and transferring of a variety of workpieces. The jaw tips of the present disclosure are designed to allow for the gripping, transportation, and handling of workpieces that are flat or planar, or which have other than flat or planar shapes, including complex bent or curved shapes. The jaw tips of the present disclosure are particularly useful for gripping, transporting, and handling stamped or molded workpieces, although not limited for use therewith.

The present disclosure is also directed to gripper jaw tips which are designed to prevent or reduce the formation of particulate that tend to flake or peel off workpieces at or near the site they are gripped. Such flaking or peeling can occur due to deformation of a workpiece.

The present disclosure is further directed to gripper jaw tip assemblies which include sensors that can be used to sense the presence or absence of a workpiece. Such sensors can be mounted adjacent or within the gripper jaw tips or the gripper jaw itself. Suitable sensors include mechanical sensors, magnetic sensors, optical sensors, and sensors which detect electrical properties. Mechanical sensors that are tripped or otherwise moved when contacting a workpiece, and optical sensors can be used in conjunction with metal and non-metal workpieces. Magnet sensors and sensors that detect electrical properties such as conductance can be used in conjunction with workpieces that are made from metal, magnetizable materials, and electrically conductive materials.

The present disclosure is also directed to extenders for gripper jaw tips which can be used to extend the reach of gripper jaw tips. The tip extenders include bases which are configured to be coupled to tip seats of gripper jaw members and one or more arm members which extend from the bases. The arm members include through-bores by which various gripper jaw tips can be coupled to the tip extenders. According to one embodiment, the tip extenders are configured so that the arm members thereof will extend forward of gripper jaw members, thus increasing the forward reach of the gripper jaw members. According to another embodiment, the tip extenders are configured so that the arm members thereof will extend outward from the sides of gripper jaw members, thus increasing the sideways reach of the gripper jaw members. In further embodiments, the tip extenders are configured so that the arm members thereof extend from their respective bases in any desired direction.

The present disclosure is further directed to padded gripper jaw tips which are provided with fluid expelling channels in their faces. The fluid expelling channels are configured to direct fluids trapped between the faces of the padded jaw tips and a workpiece, away from the contacting surfaces. During processing, some workpieces or portions thereof may be coated with fluids such as oils, cutting or machining fluids, corrosion protective coatings, etc. The use of fluid expelling channels according to the present disclosure will ensure that such fluid-coated workpieces are tightly or securely grasped, by forcing the coated fluid away from the contacting surfaces in much the same way as tire treads are designed to channel surface water away from between tires and road surfaces. The fluid expelling channels can have a number of configurations that are useful for round, square and rectangular tip pads.

The gripper jaw tips and tip assemblies of the present disclosure will be described hereafter with reference to an exemplary gripper assembly that includes gripper jaws having stepped tip seats. It is to be understood that the gripper jaw tips and tip assemblies that include sensors and sensor mounts are not limited for use with any particular gripper assembly or any particular gripper jaw design.

Figure 1:
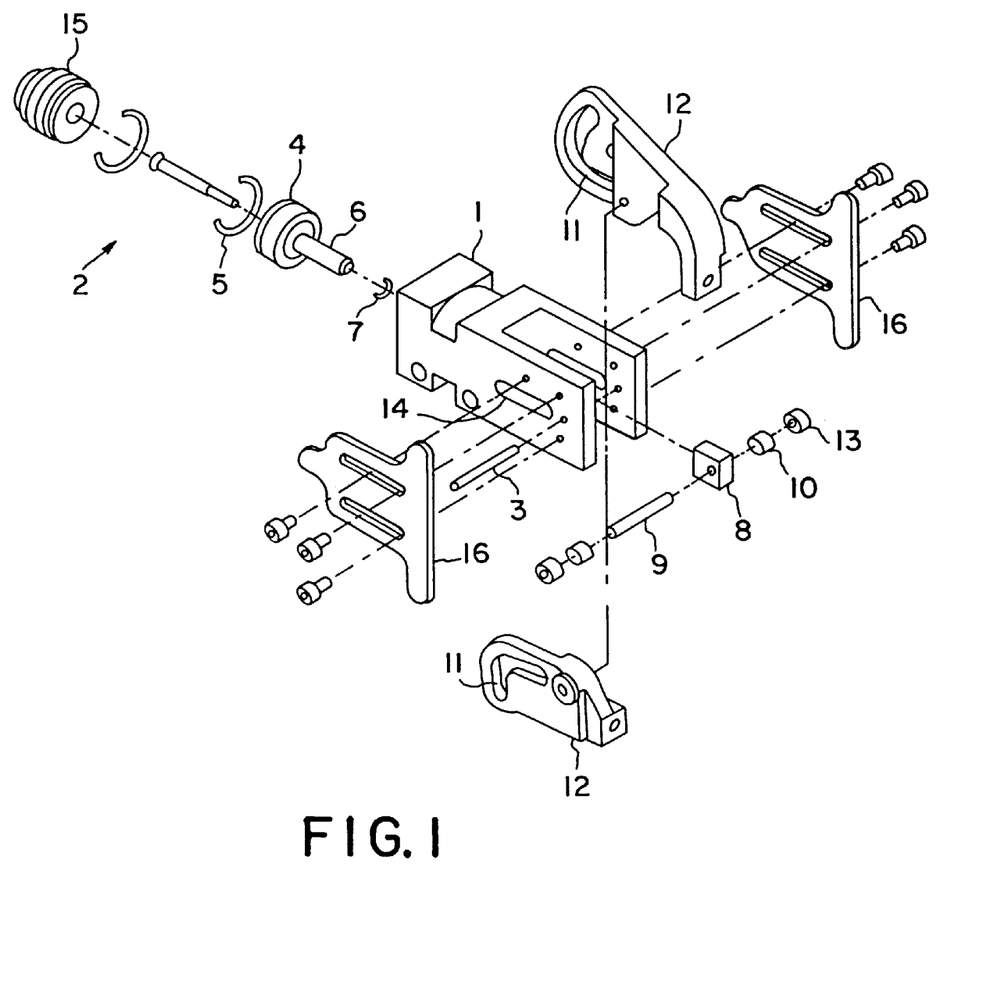
FIG. 1 is an exploded perspective view of a fluid actuated gripper assembly.

FIG. 1 is an exploded perspective view of a basic fluid actuated gripper assembly. The gripper assembly depicted in FIG. 1 includes a body 1, a piston assembly 2, a jaw pivot pin 3 and a jaw driver assembly. The piston assembly 2 includes piston 4, piston seal 5, piston shaft 6, and piston shaft seal 7. The jaw driver assembly includes cross piece 8 which is attached to piston shaft 6, cam pin 9 which is coupled to cross piece 8, jaw bushings 10 which are received in cam slots 11 of the jaw members 12, and slider bushings 13 which are received in longitudinal slots 14 formed in the side walls of the yoke structure of the body 1. The piston 4 is contained within a piston chamber that is formed in the base of body 1 and sealed by plug 15. As the piston 4 moves under the influence of fluid pressure, the cam pin 9 slides along cam slots 11, causing the jaw members 12 to either open or close. Impact plates 16 can be attached to the sides of the body 1 so that they extend beyond the front of the body 1 and protect the body from impact damage. Although the two jaw members 12 depicted in FIG. 1 are not the same, it is to be understood that other jaw members could be used including similar jaw members. FIG. 1 merely depicts the structure of a basic gripper assembly for illustrative purposes.

Figure 2A:
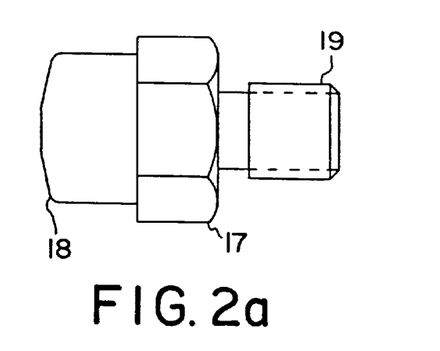
FIGS. 2a and 2b are side and end views of a convex gripperjaw tip according to one embodiment of the present disclosure.
Figure 2B:
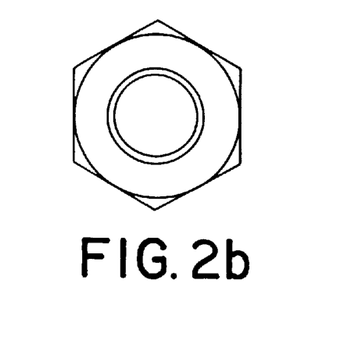

FIGS. 2a and 2b are side and end views of a convex gripper jaw tip according to one embodiment of the present disclosure. As depicted, the gripper tip of FIG. 2a includes a base 17 which is depicted as having a hexagonal shape, a cylindrical portion which extends from base 17 and includes a convex face 18, and a threaded stud 19 which extends from the base 17 on an opposite side from the convex face 18. The convex face 18 has a partial spherical shape with a minimum radius of curvature of about 0.25 inches. In practice, there is no upper limit to the radius of curvature of the convex faces so long as flat facial surfaces are avoided. A preferred minimum for the radius of curvature is about 0.40 to 0.50 inches. According to one embodiment which was found to be particularly useful for purposes of the present disclosure, convex faces having a radius of curvature of about 0.80 inches were employed. As depicted in FIG. 2a, the radial center of the convex face 18 is located along the center line of the gripper jaw tip within the threaded stud 19. It is to be understood that the radial center of the convex face 18 could be located along the center line of the gripper jaw tip at any location, including beyond the threaded stud 19 or beyond the cylindrical portion so long as a convex face or spherical structure is produced.

FIG. 2b depicts the hexagon shape of base 17. According to alternative embodiments, base 17 can be of any desired shape such as square, rectangular, round, round with parallel flat sides, etc. The base 17 is used to tighten the threaded stud 19 into a corresponding threaded bore on the tips of a gripper jaw member. Accordingly, the periphery of the base 17 should include surfaces which can be easily gripped with a wrench or other tool for tightening purposes.

Figure 3A:
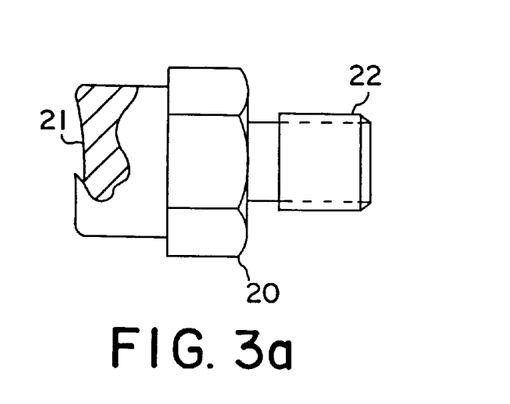
FIGS. 3a and 3b are side and end views of a concave gripperjaw tip according to one embodiment of the present disclosure.
Figure 3B:
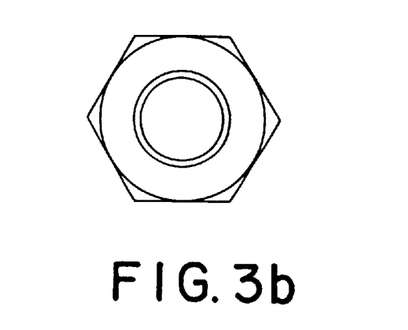

FIGS. 3a and 3b are side and end views of a concave gripper jaw tip according to one embodiment of the present disclosure. As depicted, the gripper tip of FIG. 3a includes a base 20 which is depicted as having a hexagonal shape, a cylindrical portion which extends from base 20 and includes a concave face 21, and a threaded stud 22 which extends from the base 20 on an opposite side from the concave face 21. The concave face 21 has a partial spherical concave shape that is complementary to the convex shape of the gripper jaw tips of FIGS. 2a and 2b so that a workpiece can be gripped therebetween. It is noted that the concave face 21 need not form a spherical cavity to receive either a gripped tip with a convex face or partial spherical shape.

FIG. 3b depicts the hexagon shape of base 20. According to alternative embodiments, base 20 can be of any desired shape such as square, rectangular, round, round with parallel flat sides, etc. The base 20 is used to tighten the threaded stud 22 into a corresponding threaded bore on the tips of a gripper jaw member. Accordingly, the periphery of the base 20 should include surfaces which can be easily gripped with a wrench or other tool for tightening purposes.

In use, opposed jaws of a gripper assembly are provided with one convex gripper tip as depicted in FIGS. 2a and 2b and a matching convex gripper tip as depicted in FIG. 3a and 3b.

Figure 4:
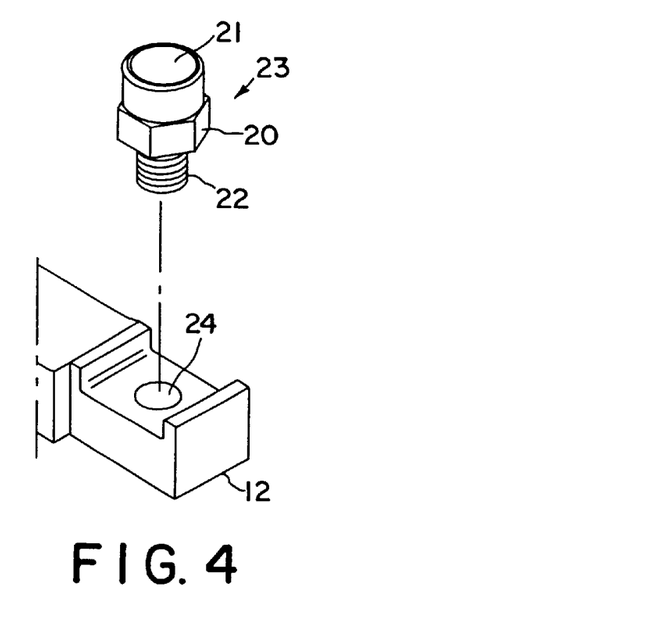
FIG. 4 is a perspective view of a concave gripper jaw tip which depicts how the tip is received in a gripper jaw member.

FIG. 4 is a perspective view of a concave gripper jaw tip which depicts how the tip is received in a gripper jaw. As depicted, the threaded stud 22 of the concave gripper tip 23 is received in a threaded bore 24 provided in jaw member 12. Although the jaw member 12 in FIG. 4 is depicted as having a stepped tip seat, it is to be understood that such a tip seat is not required to receive the gripper tips of FIGS. 2–3. As discussed above, the gripper tip 23 can be tightened into threaded bore 24 by use of a wrench or other tool that is designed to engage base 20.

The convex and concave gripper tips of the present disclosure have been found to eliminate or reduce the formation of particulate that tend to flake or peel off workpieces at or near the site they are gripped by the tips. Such flaking or peeling is often attributed to the surface deformation of a workpiece. The gripper tips of the present disclosure reduce or eliminate the formation of particulates by avoiding sharp or abrupt edges where gripping forces are applied to a workpiece.

Figure 5:
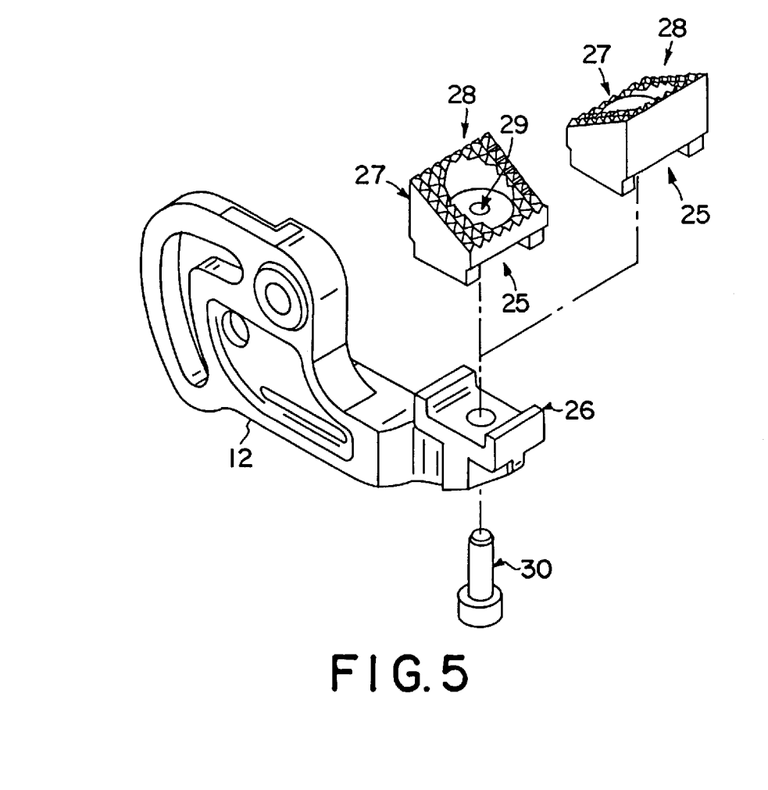
FIG. 5 is a perspective view of angled gripper jaw tips which depicts how the tips are received in a gripper jaw member.

FIG. 5 is a perspective view of angled gripper jaw tips which depicts how the tips are received in a gripper jaw. The gripper tips of FIG. 5 include recessed or stepped bases 25 which are rectangular so as to be received and mate with a recessed or stepped tip seat 26 formed on a jaw member 12. Once bases 25 of the gripper tips 27 are received in the tip seat 26 of the jaw members 12, the overlapping edges which project from the recessed or stepped portions restrict lateral motion between the gripper tips 27 and the tip seats 26.

The gripper tips 27 have workpiece gripping surfaces 28 which are formed at an acute angle with respect to their bases. The workpiece gripping surfaces 28 can be provided with a diamond point structure as depicted or any suitable surface structure, including a smooth surface. In addition, the workpiece gripping surface can be metal or formed of a polymeric or elastomeric material. The gripping surfaces 28 can be provided any standard angles with respect to the base of the gripper tip, including for example, 10°, 15°, 20°, 25°, 30°, . . . 55°, 60°, 65°, 70°, 75°, etc. or at any angle in between.

The gripper tips 27 are provided with counter-sunk threaded bores 29 which are provided to receive mechanical fasteners 30 that can be used to secure the gripper tips 27 to the jaw members 12. Alternatively, the mechanical fasteners could be inserted through bores in the gripper tips and received in threaded bores in the jaw members.

Figure 6A:
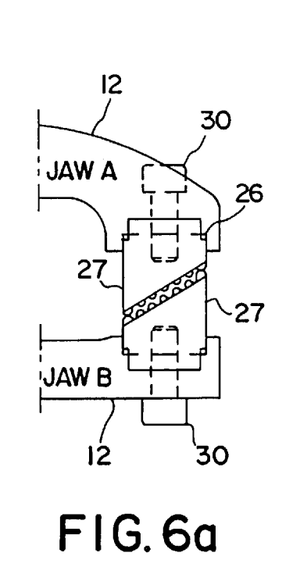
FIGS. 6a and 6b are side views of the gripper jaw tips of FIG. 5 which depict alternative ways of aligning the gripper jaw tips.
Figure 6B:
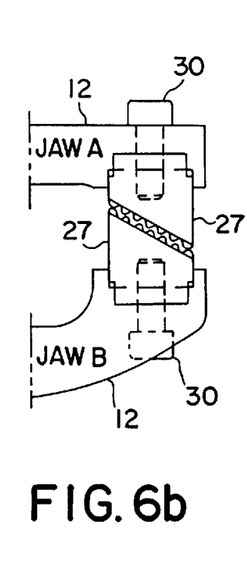

FIGS. 6a and 6b are side views of the gripper jaw tips of FIG. 5 which depict alternative ways of aligning the gripper jaw tips. As can be understood from FIGS. 6a and 6b, the recessed or stepped portion 25 of the gripper tips 27 cooperate with the recessed or stepped tip seat 26 in the jaw members so that the angled gripper tips 27 are properly aligned. The recessed or stepped portion 25 of the gripper tips 27 allow the gripper tips 27 to be attached to the jaw members 12 so that the angle at which opposed gripper tips 27 meet is aligned as shown in either FIG. 6a or 6b. It is to be understood that the structure of the recessed or stepped portions could be designed, e.g., notched, so as to allow the gripper tips 27 to be coupled to the tip seats 26 at four positions instead of just the two positions depicted in FIGS. 6a and 6b. Other engaging and position aligning structures could be provided on the base of the gripper tips 27 and the tip seats 26. For example, the gripper tips 27 could be cylindrical and the tip seats 26 could have a cylindrical seat with cooperating aligning structures on the bottom of the gripper tips 27 and the bottom of the cylindrical seats 26. Alignment structures could be eliminated. However, absent alignment structures, it would be necessary to align opposed gripper tips 27 and thereafter secure them tightly to the jaw members 12. It is also possible to provide gripper tips that have compound gripping surface angles or even curved surfaces that mate together.

Figure 7:
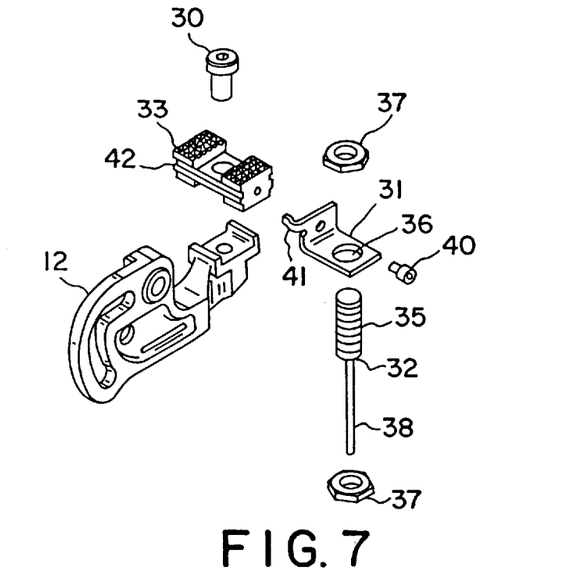
FIG. 7 is an exploded view of a gripper tip assembly which includes a workpiece sensor.

FIG. 7 is an exploded view of a gripper tip assembly which includes a workpiece sensor. The gripper tip assembly of FIG. 7 includes a bracket 31 that can be used to support a sensor 32 adjacent one of an opposed pair of gripper tips 33, 34. In the embodiment depicted in FIG. 7 the sensor has an externally threaded portion 35 which can be received in a through-hole 36 in bracket 31 and held in position by a pair of threaded nuts 37. As can be understood, the position of the leading surface of the sensor 32 can be readily adjusted by loosening, positioning and retightening the threaded nuts 37. The lead 38 of the sensor 32 can be coupled to an audio or visual signaling device that will indicate the presence or absence of a workpiece between the gripper tips 33, 34. Alternatively, the sensor 32 could be coupled to an automatic counter or control device or system.

The bracket 31 can be coupled to one of the gripper tips 33 by a mechanical fastener 40 such as a threaded screw or bolt. In order to maintain alignment of the bracket 31, two or more mechanical fasteners could be used to secure the bracket 31 to the gripper tip 33. Alternatively, the bracket 31 could be provided with a structure which engages a corresponding structure on the gripper tip 33 or a portion of the gripper jaw 12. For example, as illustrated in FIG. 7, bracket 31 includes a projection 41 that engages a groove 42 provided on the gripper tip 33. In other embodiments, the sensor bracket 31 can be welded to gripper tip 33. As depicted, gripper tip 33 can be secured to gripper jaw 12 by a mechanical fastener 30. It is noted that the embodiment of the disclosure depicted in FIG. 7 and throughout, includes a jaw member having a recessed or stepped tip seat and a gripper tip that has a complimentarily recessed or stepped base. Using this similar recessed or stepped structural configuration allows for interchangeability of all the gripper tips with the jaw members.

Figure 8A:
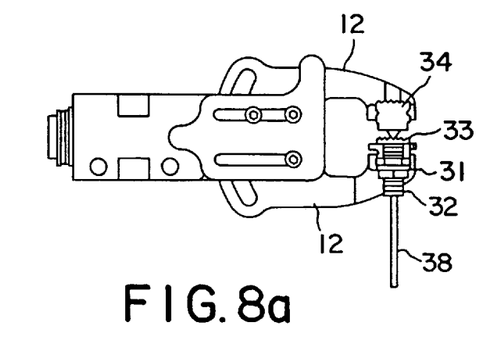
FIG. 8a is a side view of a gripper assembly having the workpiece sensor of FIG. 7.
Figure 8B:
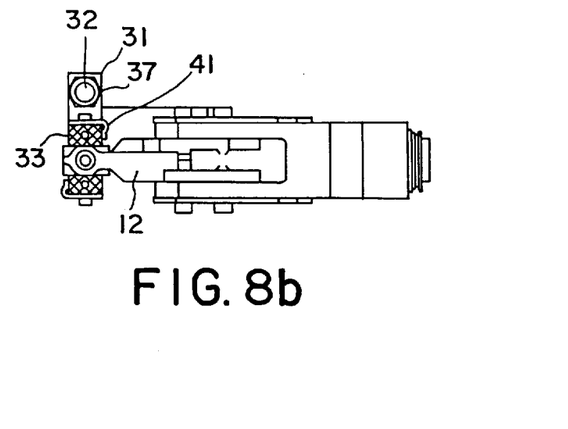
FIG. 8b is a top view of a gripper assembly having the workpiece sensor of FIG. 7.
Figure 8C:
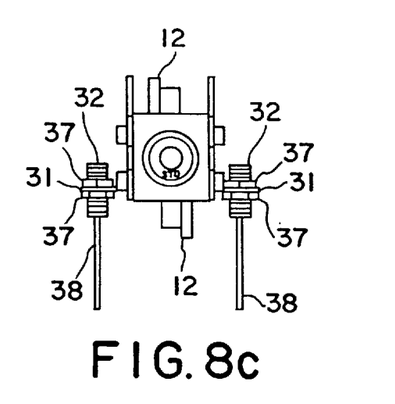
FIG. 8c is an end view of a gripper assembly having the workpiece sensor of FIG. 7.

FIG. 8a is a side view of a gripper assembly having the workpiece sensor of FIG. 7. FIG. 8b is a top view of a gripper assembly having the workpiece sensor of FIG. 7. FIG. 8c is an end view of a gripper assembly having the workpiece sensor of FIG. 7. FIGS. 8a–8c depict how the tip assembly allows the leading edge of the sensor 32 to be positioned adjacent the closed gripper tips where it will sense the presence or absence of a workpiece. FIG. 8c indicates how two sensor support brackets 31 can be used.

As discussed above, suitable sensors include mechanical sensors, magnetic sensors, optical sensors, and sensors which detect electrical properties. Mechanical sensors that are tripped or otherwise moved when contacting a workpiece, and optical sensors can be used in conjunction with metal and non-metal workpieces. Magnet sensors and sensors that detect electrical properties such as conductance can be used in conjunction workpieces that are made from metal, magnetizable materials, and electrically conductive materials.

Figure 9:
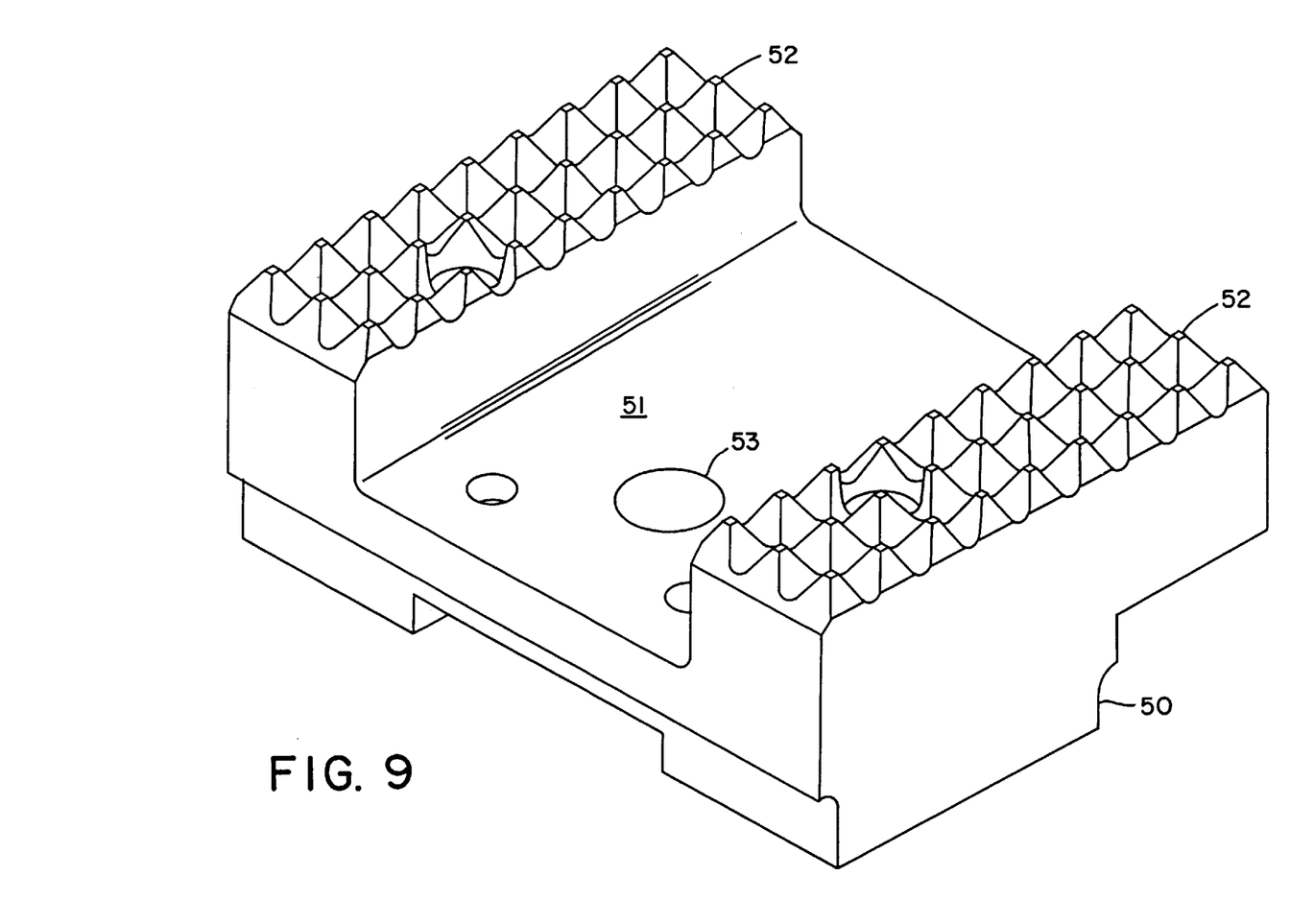
FIG. 9 is a perspective view of a gripper tip which has been notched out and configured to receive a sensor in the face thereof.

According to another embodiment of the present disclosure which is depicted in FIG. 9, a sensor can be fitted in the face of a gripper tip. FIG. 9 is a perspective view of a gripper tip which has been notched out and configured to receive a sensor in the face thereof. This gripper tip 50 is similar to gripper tip 33 depicted in FIG. 7, but has been notched out and provided with a wider portion which serves as a base 51 upon which a flat sensor can be mounted between the adjacent workpiece gripping surfaces 52. The sensor can be secured in place by mechanical fasteners or clips. Leads for the sensor can either pass through a hole(s) provided in base 51 or from an end of the sensor. The gripper tip 50 can include a threaded bore 53 by which it can be secured to a gripperjaw. In this case, a threaded fastener can be inserted though the back of a gripper jaw and received in the threaded bore 53 of the gripper tip.

Figure 10:
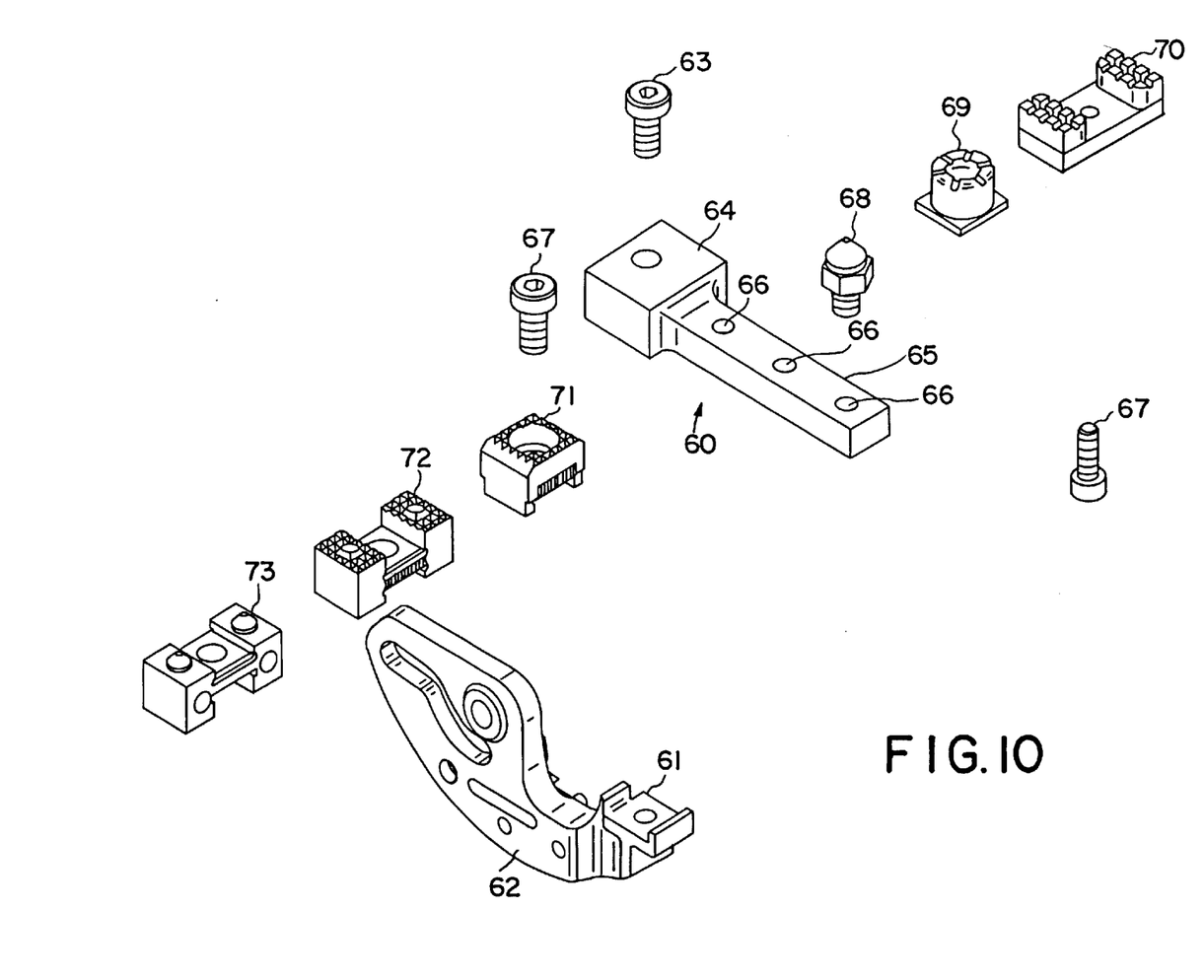
FIG. 10 is an exploded view of a gripper jaw tip assembly which includes a tip extender that can be used to extend the working length of gripper tips.

FIG. 10 is an exploded view of a gripper jaw tip assembly which includes a tip extender that can be used to extend the working length of gripper tips. The gripper jaw tip assembly of FIG. 10 includes a tip extender 60 that can be coupled to the tip seat 61 of jaw member 62 by a suitable means such as mechanical fastener 63. The tip extender 60 includes a base portion 64 and an arm member 65. Although not shown, the base portion 64 can include a cut-out structure (in the bottom as depicted in FIG. 10) which is shaped complimentarily to the tip seat 61. The inclusion of such a cut-out or shaped portion will ensure that the arm member 65 of the tip extender 60 of FIG. 10 will be easily aligned with the jaw member 62 when coupled thereto. The tip extender 60 of FIG. 10 can be aligned so that the axis of the arm member 65 is parallel to the axis of the jaw member 62. Alternatively, the tip extender 60 of FIG. 10 can be designed so that the arm member 65 of the tip extender 60 extends from the jaw member 62 at any desired angle. In other embodiments a curved or angled arm member can be used.

The arm member 65 of tip extender 60 includes at least one through-bore 66, which can be used to couple various jaw tips thereto. The through-bore(s) 66 can have internal threads into which jaw tips can be threaded or into which a threaded fastener 67 can be used to couple a jaw tip to the arm member 65 of the tip extender 60. Alternatively, the through-bore(s) 66 can be non-threaded and a threaded fastener 67 can be used to couple a jaw tip to the arm member 65 of the tip extender 60.

FIG. 10 depicts examples of various jaw tips 68–73 which can be coupled to and used in conjunction with the tip extender 60. These include a single cone gripper tip 68, a single padded gripper tip 69, a double padded gripper tip 70, a single diamond point pad gripper tip 71, a double diamond point pad gripper tip 72, and a double cone gripper tip 73.

Figure 11:
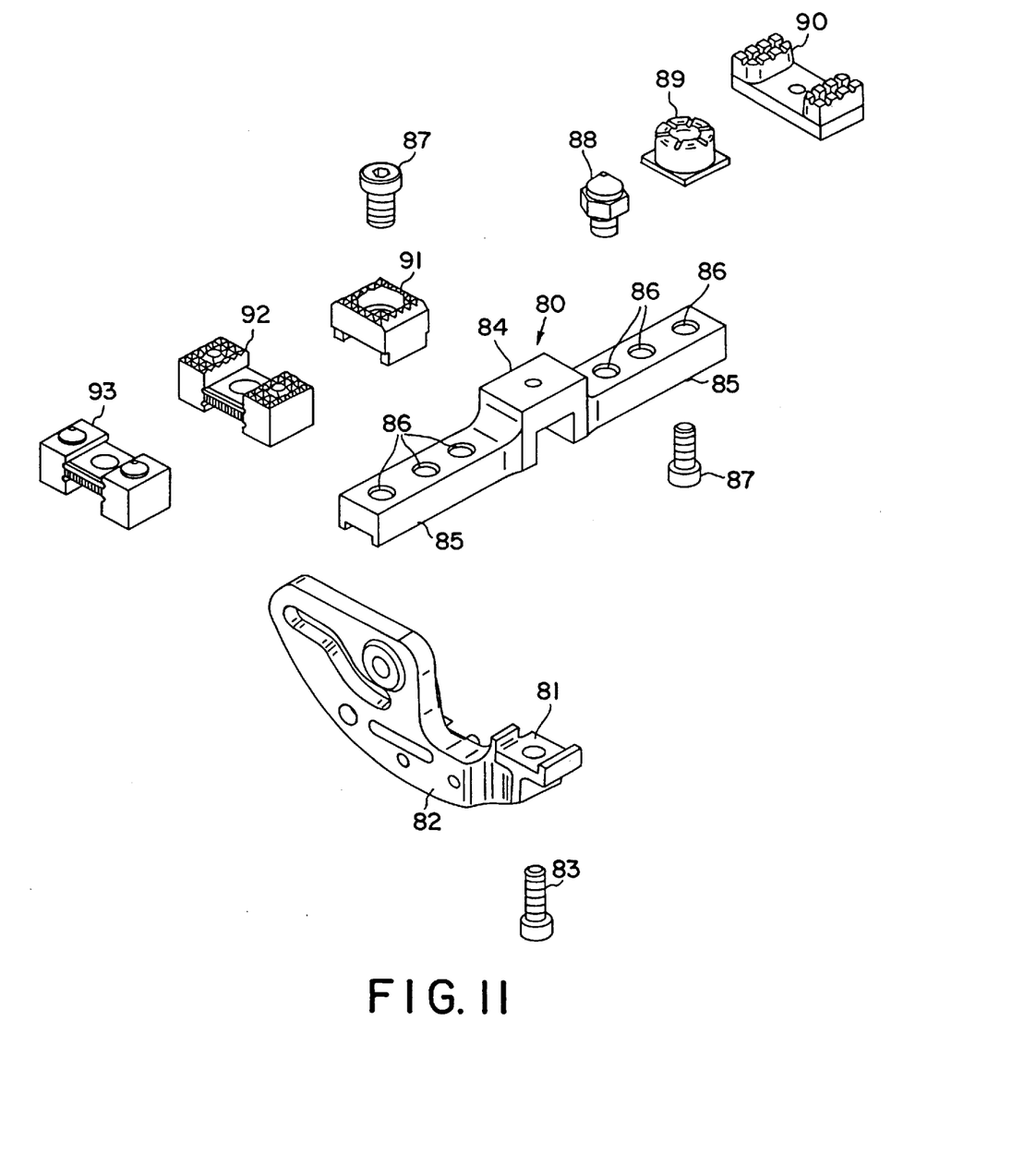
FIG. 11 is an exploded view of a gripper jaw tip assembly which includes a tip extender that can be used to extend the working width of gripper tips.

FIG. 11 is an exploded view of a gripperjaw tip assembly which includes a tip extender that can be used to extend the working width of gripper tips. The gripper jaw tip assembly of FIG. 11 includes a tip extender 80 that can be coupled to the tip seat 81 of jaw member 82 by a suitable means such as mechanical fastener 83. The tip extender 80 includes a base portion 84 and a pair of arm members 85. Although not shown, the base portion 84 can include a cut-out structure (in the bottom as depicted in FIG. 11) which is complementary to the tip seat 81. The inclusion of such a cut-out or shaped portion will ensure that the arm members 85 of the tip extender 80 of FIG. 11 will be easily aligned to be perpendicular with the jaw member 82 when coupled thereto. The tip extender 80 of FIG. 11 is depicted as being aligned so that the arm members 85 are perpendicular to the axis of the jaw member 82. Alternatively, the arm members 85 of the tip extender 80 of FIG. 11 can be aligned with the jaw member 82 at any suitable angle. In other embodiments two or more straight, and/or curved and/or angled arm members can be used.

The arm members 85 of tip extender 80 each includes at least one though-bore 86, which can be used to couple various jaw tips thereto. The through-bore(s) 86 can have internal threads into which jaw tips can be threaded or into which a threaded fastener 87 can be used to couple a jaw tip to the arm members 85 of the tip extender 80. Alternatively, the through-bore(s) 86 can be non-threaded and a threaded fastener 87 can be used to couple a jaw tip to the arm members 85 of the tip extender 80.

FIG. 11 depicts examples of various jaw tips 88–93 which can be coupled to and used in conjunction with the tip extender 80. These include a single cone gripper tip 88, a single padded gripper tip 89, a double padded gripper tip 90, a single diamond point pad gripper tip 91, a double diamond point pad gripper tip 92, and a double cone gripper tip 93.

Figure 12A:
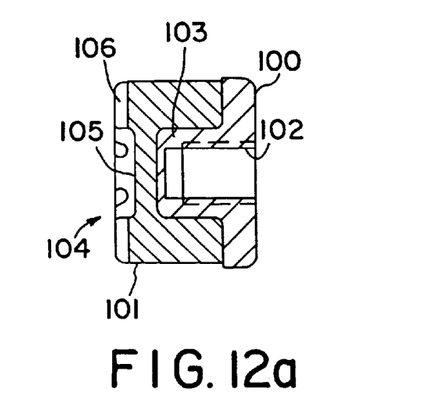
FIG. 12a is a cross-sectional side view of a padded gripper tip having fluid expelling channels.

FIG. 12a is a cross-sectional side view of a padded gripper tip having fluid expelling channels. The padded gripper tip of FIGS. 12a–12c includes a base 100 which can be made of metal and a pad portion 101 which can be made from a rubber material, polymeric material, plastic material or other suitably resilient material. The base 100 includes an internally threaded bore 102 which extends within a projection 103 of the base 100. As depicted, the internally threaded bore 102 can terminate at a bottom that is within the projection 103. The pad portion 101 is secured, e.g., molded over or otherwise bonded, on the projection 103.

Figure 12B:
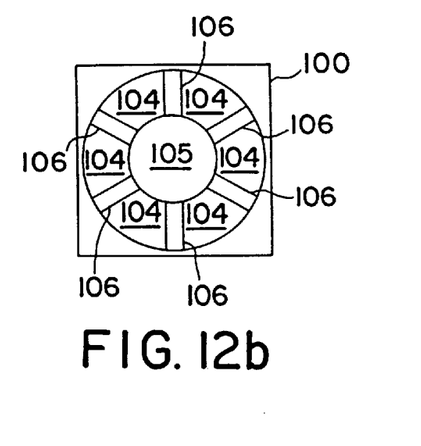

FIG. 12b is an end view of the padded gripper tip of FIG. 12a. As depicted in FIG. 12b the face 104 of the pad portion 101 includes a central recessed portion 105 and a plurality of channels 106 which are radially disposed with respect to the central recessed portion 105. As depicted in FIG. 12a, the central recessed portion 105 can have a depth which is greater than the depth of channels 106.

Figure 12C:
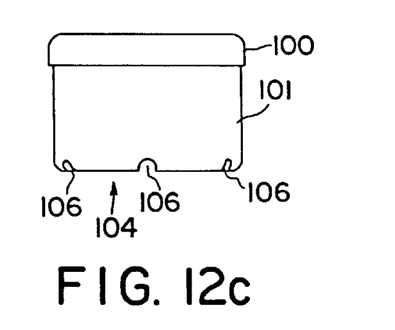

FIG. 12c is a side view of the padded gripper tip of FIG. 12a. As illustratively depicted in FIG. 12c, the channels can have U-shaped bottoms.

When the face of the padded gripper tip of FIGS. 12a–12c is pressed against a portion of a workpiece that has a liquid coating thereon, the liquid that might otherwise be trapped between the face 104 of the pad portion 101 of the tip and the workpiece surface is squeezed into the channels 106 and central recessed portion 105. Excess fluid is expelled outward through the channels 106 as the pad portion 101 of the gripper tip is compressed against the surface of the workpiece.

It is to be understood that the present disclosure is not limited to the pattern formed by the central recess portion 105 and channels 106 which is depicted in FIGS. 12a–12c. Other patterns which do not include channels that are blocked from communicating with the sides of the pad portion 101 can also be used.

The padded gripper tip of FIGS. 12a–12c can be attached to the tip seat of a jaw member of a gripper by use of a threaded fastener which can be passed through the tip seat of the jaw member and received in the internally threaded bore 102. Alternatively, the padded gripper tip could include a threaded projection in place of the internally threaded bore, and the threaded projection could be driven into an internally threaded bore provided on the tip seat of a jaw member.

Figures 13A, 13B:
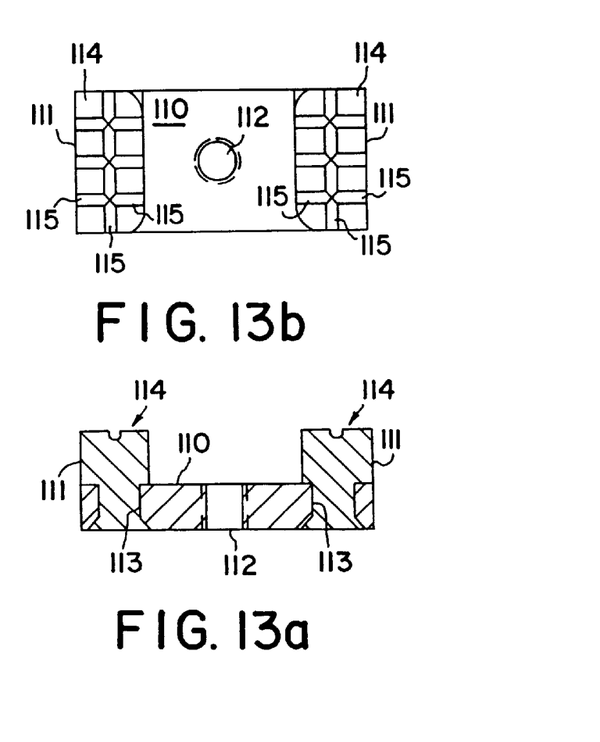

FIG. 13a is a cross-sectional side view of another padded gripper tip having fluid expelling channels. The padded gripper tip of FIGS. 13a–13c includes a rectangular base 110 which can be made of metal and a pair of pad portions 111 which can be made from a rubber material, a polymeric material, a plastic material or other suitably resilient material. The base 110 includes an internally threaded bore 112 which extends therethrough. The base 110 includes a pair of through-bores 113 adjacent either end into which the pad portions 111 can be molded.

FIG. 13b is an end view of the padded gripper tip of FIG. 13a. As illustratively depicted in FIG. 13b, the face 114 of each pad portion 111 includes a plurality of channels 115 which can be arranged in an array or grid pattern.

Figure 13C:
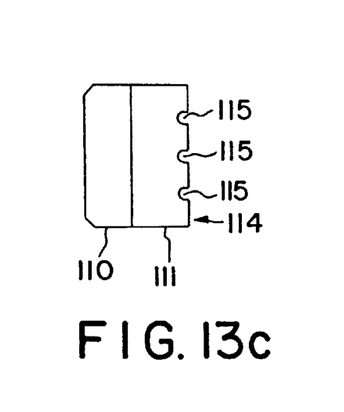

FIG. 13c is a side view of the padded gripper tip of FIG. 13a. As depicted in FIGS. 13a and 13c, the channels 115 can have U-shaped bottoms.

It is to be understood that the present disclosure is not limited to the pattern formed by the channels 115 which is depicted in FIGS. 13a–13c. Other patterns which do not include channels that are blocked from communicating with the sides of the pad portions 111 can also be used.

The padded gripper tip of FIGS. 13a–13c can be attached to the tip seat of a jaw member of a gripper by use of a threaded fastener which can be passed through the tip seat of the jaw member and received in the internally threaded bore 112. Alternatively, the padded gripper tip could include a threaded projection in place of the internally threaded bore, and the threaded projection could be driven into an internally threaded bore provided on the tip seat of a jaw member, or a through-hole.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present disclosure as described by the claims which follow.

What is claimed is:

1. A set of opposable angled gripper jaw tips which comprises:
   a first jaw tip;
   a base formed on the first jaw tip;
   a central axis disposed through the first jaw tip substantially perpendicular to the base;
   a gripping surface integral with the first jaw tip;
   the gripping surface is formed non-perpendicular to the central axis of the first jaw tip;
   a second jaw tip;
   a base formed on the second jaw tip;
   a central axis disposed through the second jaw tip substantially perpendicular to the base; and
   a gripping surface integral with the second jaw tip;
   the gripping surface is formed non-perpendicular to the central axis of the second jaw tip;
   the gripping surfaces of the first and second jaw tips are also complimentarily angled so that they become substantially coplanar when closed together.

2. The set of opposable angled gripper jaw tips of claim 1, wherein the gripping surfaces of the first and second jaw tips each have a diamond point structure.

3. The set of opposable angled gripper jaw tips of claim 1, wherein the gripping surface of the first jaw tip is aligned at 45 degrees with respect to the central axis thereof.

4. A gripper assembly comprising first and second opposable jaw members, each having a tip seat, each tip seat being substantially parallel to one another when the jaw members are in a closed position, the gripper assembly also having a set of opposable angled gripper jaw tips, the opposable angled gripper jaw tips comprising:
   a first jaw tip coupled to the tip seat of the first opposable jaw member;
   a gripping surface integral with the first jaw tip;
   the gripping surface oriented non-parallel to the tip seat;
   a second jaw tip coupled to the tip seat of the second opposable jaw member; and
   a gripping surface integral with the second jaw tip;
   the gripping surface oriented non-parallel to the tip seat;
   the gripping surfaces of the first and second jaw tips are complimentarily angled so that they become substantially coplanar when closed together.

5. The opposable angled gripper jaw tips of claim 4, each further comprising a base, each base abuts the tip seat of the jaw members, respectively, and each base has an alignment structure which allows the jaw tips to be mounted in different orientations with respect to the jaw members.

6. The opposable angled gripper jaw tips of claim 5, when mounted in different orientations with respect to the jaw members, the gripping surfaces of the jaw tips remain complimentarily angled so that they become substantially coplanar when closed together.

7. The opposable angled gripper jaw tips of claim 4, wherein the gripping surfaces of the first and second jaw tips each have a diamond point structure that is coplanar to one another when the jaw tips are closed together.

8. A gripper assembly for holding a workpiece comprising:
   first and second jaw members;
   each of the jaw members having a tip seat;
   each tip seat is parallel to one another when the jaw members are in a closed position;
   a set of opposable gripper jaw tips, the jaw tips comprising:
      a first jaw tip coupled to the tip seat of the first jaw member;
      a gripping surface integral with the first jaw tip;
      the gripping surface oriented non-parallel to the tip seat;
      a second jaw tip coupled to the tip seat of the second jaw member;
      a gripping surface integral with the second jaw tip;
      the gripping surface oriented non-parallel to the tip seat;
      the gripping surfaces of the first and second jaw tips are complimentarily angled so that they become substantially coplanar when in a closed position.

9. The gripper assembly of claim 8, wherein the jaw tips are configured to hold the workpiece at an angle non-parallel to the tip seats without having to move the gripper assembly to that angle.

10. The gripper assembly of claim 9, wherein the jaw tips are replaceable with a second set of jaw tips having gripping surfaces that are parallel to the tip seats.

11. A gripper assembly comprising:
    a driver movable within a plane;
    a pair of opposable jaw members;
    at least one of the pair of opposable jaw members is movable in response to movement of the driver;
    a pair of angled tips;
    each of the angled tips is attached to one of the opposable jaw members;
    a gripping surface is formed on each of the angled tips; and
    each gripping surface is complimentarily angled to each other;
    each gripping surface is oriented non-parallel and non-perpendicular relative to the plane;
    each gripping surface becomes substantially coplanar to each other when the jaw members are closed together.

12. A modular gripper assembly which comprises:
    a body having a yoke structure defined at one end thereof by a pair of spaced-apart wall members, and a fluid driven actuator at an opposite end, the actuator defining a first plane;
    a pair of opposable jaw members, at least one of the pair of opposable jaw members being pivotal within a second plane, and each of the pair of opposable jaw members having through-slots therein and being independently removable and replaceable by other jaw members;
    a single cam pin extending into the through-slots of each of the pair of opposable jaw members;
    a linkage structure driven by the fluid driven actuator and coupled to the single cam pin between the pair of opposable jaw members along a direction which is substantially perpendicular to the second plane; and
    a pair of tip ends which are aligned with one another; in each tip end includes a gripping surface complimentarily angled non-parallel to the first plane defined by the actuator, and the gripping surfaces become substantially coplanar to each other when the jaw members are in a closed position.

13. The modular gripper assembly of claim 12, wherein the base of each of the first and second jaw tips has alignment structure which allows the first and second jaw tips to be mounted in different orientations with respect to gripper assembly.

* * * * *